United States Patent Office 3,510,265
Patented May 5, 1970

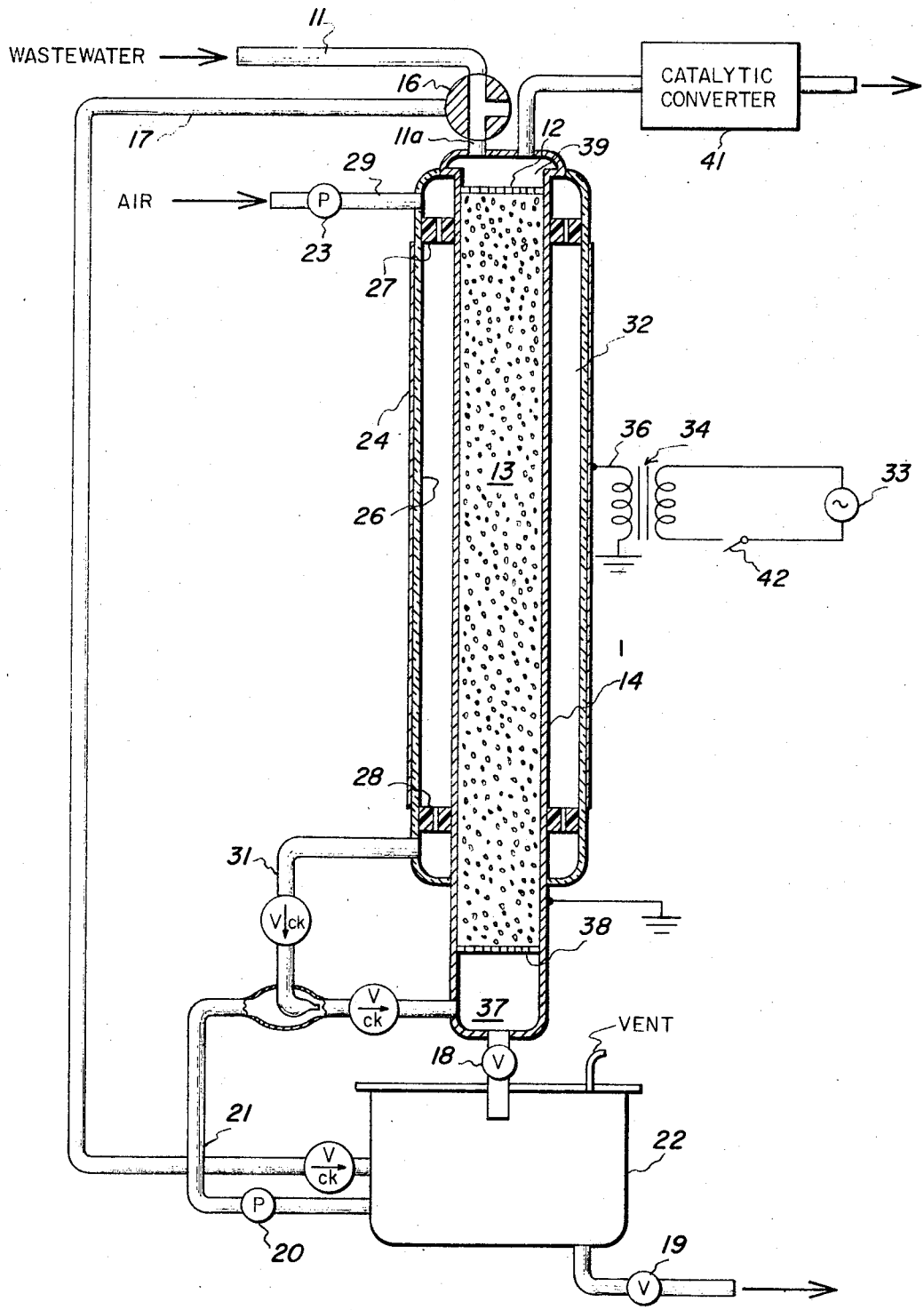

---

3,510,265
WASTEWATER TREATMENT APPARATUS INCORPORATING ACTIVATED CARBON BED AND REGENERATOR THEREFOR
Masayuki Kawahata, Scotia, N.Y., assignor to General Electric Company, a corporation of New York
Filed July 1, 1969, Ser. No. 838,067
Int. Cl. B01j; B01j 9/00
U.S. Cl. 23—260                3 Claims

ABSTRACT OF THE DISCLOSURE

Spaced concentric electrodes comprising an electric discharge reactor surround a centrally-disposed activated carbon column of carbon granules (or powder) through which filtered wastewater is passed. The activated carbon layer removes dissolved organic contaminants from the wastewater by adsorption thereof on the granule surfaces until the carbon becomes saturated and regeneration is required. To carry out the regeneration the flow of wastewater is interrupted and treated wastewater is pumped through the carbon bed, while at the same time (a) air is admitted to the discharge reactor, (b) ozone is produced therein by electric discharge and (c) the air-ozone mixture is passed up through the carbon bed/wash water mass for reaction of the ozone with organic material desorbed from the carbon as well as that organic material still adsorbed on the carbon.

---

BACKGROUND OF THE INVENTION

Organic contaminants (conveniently identified as "organic carbon") occur in untreated wastewater both in the form of suspended solids and as dissolved solids. The term "dissolved" includes not only those agents in solution, but also suspended particles smaller than about 1 micron in largest dimension. Organic contaminants include, for example, soaps, detergents, proteins, polysaccharides and fats.

Removal of the organic contaminants present as suspended solids in such wastewater may be effectively accomplished in several ways as, for example, by sand filtration following the addition to the wastewater of various organic and inorganic flocculant materials or after subjecting the wastewater to electrocoagulation (by which flocculant material is generated in situ). The removal of dissolved organic contaminants presents a much more difficult problem, however. One method for such removal has been by the use of porous adsorbents, such as granular activated carbons, but unless the absorbent carbons can be regenerated with minimum loss of adsorption activity and with reasonable fuel and power expenditures, such a process becomes economically infeasible.

COMPARISON WITH PRIOR ART

A particularly effective integrated construction for housing a column of granular activated carbon through which wastewater is passed and for generating ozone on demand to regenerate the absorbent carbon is described herein. Although the activated carbon bed of this invention can function as a filter to mechanically remove suspended solids, the prime function of the carbon bed is to treat pre-filtered wastewater to remove dissolved organic contaminants therefrom by adsorption.

The use of an oxygenating gas in a liquid environment for the purpose of loosing, displacing and flushing away matter deposited over a granular carbon filter medium is disclosed in U.S. Pat. No. 736,669—Zoeller. In the Zoeller patent electric current is passed through the filter medium in the presence of water to generate gases, particularly oxygen, in the nascent state. However, the life-time of gaseous oxygen atoms (uncombined) is exceedingly short (about $10^{-6}$ seconds), so the effectiveness of nascent oxygen is doubtful.

The use of ozone for water treatment is proposed in U.S. Pat. No. 799,605—Lester, however, it does not appear that ozone would result from the method outlined for its generation and although a filtering operation follows the "ozone" treatment the filtering medium (sand), which is contained in bags, is not cleaned thereby. When the filter needs cleaning, the bags are removed from the unit, washed and then replaced.

SUMMARY OF THE INVENTION

An electric discharge reactor configuration encloses a centrally-disposed bed of activated carbon, which provides for the adsorption of organic contaminants dissolved in wastewater by passage of the wastewater through the activated carbon powder, or granules. When regeneration of the carbon becomes necessary, ozone is generated in the surrounding discharge reactor from ambient air supplied thereto, and the ozone/air mixture is admitted to the activated carbon bed during the circulation of wash water therethrough.

BRIEF DESCRIPTION OF THE DRAWING

The exact nature of this invention as well as objects and advantages thereof will be readily apparent from consideration of the following specification relating to the annexed drawing schematically representing the apparatus of this invention partially in cross-section.

DESCRIPTION OF THE PREFERRED EMBODIMENT

In the exemplary apparatus 10 shown in the drawing for the reduction of organic contaminant content in wastewater the filtered effluent from a wastewater treatment filtration apparatus (not shown) is fed via pipes 11 and 11a and distributor plate 12 to the granular activated carbon bed 13 packed within cylindrical metal electrode 14. An exemplary filtration device is disclosed in U.S. patent application S.N. 710,074—Dibelius et al., filed Mar. 4, 1968. As the wastewater percolates downwardly through the carbon bed 13, organic contaminants in the wastewater become adsorbed over the internal and external surfaces of the carbon particles. This wastewater treatment is continued until the surfaces of the carbon granules become saturated with the adsorbed organic contaminants.

Either by predetermined schedule or by periodic analysis it may be readily determined, when regeneration of the carbon is required.

When this state of the operation has been reached, valve 16 is rotated clockwise to place pipe 17 into flow communication with pipe 11a. Valve 18 is closed (valve 19 is in closed position) and pump 20 is started for the circulation of upgraded wastewater (to serve as wash water via pipe 21) from tank 22 up through the carbon bed 13 at a suitable flow rate. Air is pumped by means of pump 23 into the electric discharge reactor comprising the outer cylindrical electrode 24 (preferably metal foil or other thin metal coating) covering dielectric wall 26 (preferably of ceramic material, although certain plastics may be employed), the inner cylindrical electrode 14 and annular dielectric spacers 27, 28, therefor.

Both piping 29 and piping 31 (for gas inflow to and gas outflow from annular electrical discharge zone 32) are connected to the apparatus beyond the outer limits of electrode 24, to which high voltage is applied. Electrode 14 (and thereby piping 31) is grounded. As air is pumped into and through discharge zone 32, an electric discharge is maintained in the gap between electrode 14 and dielectric material 26 resulting in the production of ozone from the air passing therebetween. Power to maintain the electric discharge is received from A.C. power source 33 via the step-up transformer 34 connected to the electrode 24 by means of conductor 36. Pulse direct current may be employed in place of alternating current.

The field strength for ozone generation should have a value of at least about 30 kilowatts (peak value)/cm. of discharge gap at 14.7 p.s.i.a. Higher gas pressures will require larger values of field strength.

The conversion rate to ozone is in the range of from about 0.13–0.17 lbs. of ozone per kilowatt-hour (for air) or from about 0.25–0.33 lbs. of ozone per kilowatt-hour (for oxygen, if preferred). The humidity of the oxygen-containing gas should be kept low to optimize ozone production.

The dielectric spacers 27, 28 are provided with apertures to enable passage of the air into discharge zone 32 and exit of the air/ozone mixture from the discharge zone.

The air/ozone mixture produced in discharge zone 32 passes to plenum 37 via pipe 21 into which it is introduced and from which the wash water and air/ozone mixture pass together up through perforated support plate 38 and then up through packed carbon granule column 13. If desired, the apparatus may be modified so that the wash water may be circulated in the opposite direction (flowing down through column 13) in which case the air/ozone would be injected directly into plenum 37. This wash water (from which the organics have been removed) brings about desorption of adsorbed organic contaminants from the carbon granules, these adsorbed organics having been concentrated on the carbon particle surfaces. Some of the ozone so circulated reacts with the wash water to liberate OH radicals. The desorbed organic matter reacts with the ozone and/or OH radicals whereby the organics are destroyed or converted by oxidation. The organic contaminants so modified have an increased affinity to water and act to decrease the equilibrium adsorption concentration in the wash water. As a result desorption of the organics from the carbon granules is increased.

The efficiency of ozone usage is high, because of the disposition of the organic contaminants on the surfaces of the carbon. Also, damage to the internal pore structure of the carbon granules during regeneration is minimal as compared to that accompanying regeneration by heating.

Part of the electric discharge energy expended to generate the ozone is dissipated as heat at the reactor wall (electrode 14) and this heat is transferred to carbon column 13 thereby promoting to some degree both the desorption and oxidation process.

Any organic vapors in the gases passing upwardly from the carbon bed 13 through distributor plate 12 and collected in plenum 39 are further oxidized to carbon dioxide in the catalyst converter 41.

Activated carbons employed should have a surface of at least 50 sq. meters/gram and may, for example, be prepared from such carbonaceous materials as coal, petroleum oil fractions, wood and coconut shells, for example, by pyrolysis thereof followed by mild oxidation. Such activated carbons may also be prepared by treating oil refinery acid sludges with a neutralizing agent and heating the mixture to 800 to 1200° C. as described in U.S. Pat. No. 1,812,316—Berl incorporated herein by reference. The most effective carbons are those which have a large porous surface area (e.g. about 1000 m.$^2$/g.) with the largest fraction of pore volume (or surface area) having pore sizes ranging from 30–500 angstrom units. Such carbons are commercially available.

Standard construction materials may be employed such as stainless steel for the metal parts and porcelain for the dielectric wall, for example. The surface of electrode 14 facing discharge chamber 32 may be smooth, have a sand-blasted finish or be covered with a fine metal screen. The gap between dielectric wall 26 and the surface of electrode 14 should be in the range of from about 0.5 to 5 mm. Outer electrode 24 may consist of a thin electrically conducting surface supported by dielectric wall 26 and may, for example, be made of metal foil wrapped around wall 26.

During periods of wastewater treatment the high voltage source is disconnected from the apparatus as, for example, by means of switch 42.

In the event that the cycled wash water returned to tank 22 has too high an unmodified contaminant content, it may be pumped by means not shown to the filtered wastewater source. Otherwise, the wash water become part of the treated water.

What I claim as new and desire to secure by Letters Patent of the United States is:

1. In apparatus for the separation of dissolved organic contaminants from water comprising a confined column of particulate activated carbon in combination with means for admitting liquid flow thereto and means for discharging liquid flow therefrom, the improvement wherein the confining means for the activated carbon column is the columnar inner metal electrode of an electric discharge reactor surrounding said carbon column, said discharge reactor comprising in combination said inner electrode, a dielectric wall spaced outwardly from said inner electrode a substantially uniform distance, an outer electrode in direct contact with said dielectric wall, first means in flow communication with the space between said dielectric wall and said inner electrode for admitting a gaseous fluid into said space, second means in flow communication with said space for conducting a gaseous fluid therefrom to a volume below and in flow communica- with said carbon column and means for making electrical connection to said inner and outer electrodes whereby a voltage may be impressed across said space during transit of the gaseous fluid therethrough.

2. The improvement of claim 1 wherein the uniform distance between the inner electrode and the dielectric wall is in the range of about 0.5–5 mm.

3. The improvement of claim 1 in which a catalyst converter for the oxidation of organic vapors is in flow communication with a volume in flow communication with the carbon column and disposed thereover.

References Cited

UNITED STATES PATENTS

| | | | |
|---|---|---|---|
| 799,605 | 9/1905 | Lester | 210—63 X |
| 996,560 | 6/1911 | Bradley | 210—192 |
| 2,089,793 | 8/1937 | Hartman | 210—192 X |

SAMIH N. ZAHARNA, Primary Examiner

U.S. Cl. X.R.

23—288; 210—32, 192